(12) United States Patent
Mastro

(10) Patent No.: US 9,309,775 B2
(45) Date of Patent: Apr. 12, 2016

(54) ROTATIONAL DEBRIS DISCOURAGER FOR GAS TURBINE ENGINE BEARING

(75) Inventor: Jacob Peter Mastro, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 801 days.

(21) Appl. No.: 13/476,044

(22) Filed: May 21, 2012

(65) Prior Publication Data

US 2013/0305684 A1    Nov. 21, 2013

(51) Int. Cl.
| | |
|---|---|
| F01D 11/00 | (2006.01) |
| F01D 25/18 | (2006.01) |
| F02C 7/28 | (2006.01) |
| F16C 33/80 | (2006.01) |
| F02C 7/052 | (2006.01) |

(52) U.S. Cl.
CPC ............ *F01D 11/003* (2013.01); *F01D 25/183* (2013.01); *F02C 7/052* (2013.01); *F02C 7/28* (2013.01); *F05D 2250/182* (2013.01); *F05D 2250/60* (2013.01); *F05D 2260/607* (2013.01); *F16C 33/805* (2013.01)

(58) Field of Classification Search
CPC ...... F02C 7/28; F02C 7/052; F05D 2260/607; F16C 33/805
USPC ............................ 60/39.092; 415/111; 55/306
See application file for complete search history.

(56) References Cited

U.S. PATENT DOCUMENTS

| | | | | |
|---|---|---|---|---|
| 2,478,649 | A | * | 8/1949 | Wightman .................... 277/424 |
| 3,011,311 | A | * | 12/1961 | Williams et al. ................ 60/804 |
| 4,084,825 | A | | 4/1978 | Ludwig |
| 4,484,752 | A | * | 11/1984 | Bentley .......................... 277/377 |
| 4,852,890 | A | * | 8/1989 | Borowski ....................... 277/425 |
| 5,218,816 | A | | 6/1993 | Plemmons et al. |
| 5,358,374 | A | * | 10/1994 | Correia et al. ................... 415/47 |
| 5,533,863 | A | * | 7/1996 | Tornquist et al. ............. 415/229 |
| 5,593,165 | A | * | 1/1997 | Murray et al. ................. 277/543 |
| 5,687,973 | A | | 11/1997 | Ruppert, Jr. |
| 5,979,903 | A | * | 11/1999 | Kwasniewski ................ 277/423 |
| 6,338,578 | B1 | * | 1/2002 | Adde et al. ..................... 384/540 |
| 6,612,809 | B2 | | 9/2003 | Czachor et al. |
| 6,629,816 | B2 | * | 10/2003 | Langston et al. ............. 415/111 |
| 7,156,400 | B2 | | 1/2007 | Oates |
| 7,500,824 | B2 | | 3/2009 | Cheng et al. |
| 7,686,578 | B2 | * | 3/2010 | Klasing et al. ............. 415/173.1 |
| 8,079,809 | B2 | | 12/2011 | Selder et al. |
| 2002/0141862 | A1 | * | 10/2002 | McEwen ....................... 415/111 |

(Continued)

FOREIGN PATENT DOCUMENTS

| | | |
|---|---|---|
| EP | 0359659 A1 | 3/1990 |
| JP | H07279981 A | 10/1995 |

OTHER PUBLICATIONS

Collins English Dictionary, definition of "seal".*

(Continued)

*Primary Examiner* — Phutthiwat Wongwian
*Assistant Examiner* — Rene Ford
(74) *Attorney, Agent, or Firm* — Carlson, Gaskey & Olds, PC

(57) ABSTRACT

A debris discourager for a gas turbine engine is rotatable about an engine axis and extends between a fore end and an aft end. A portion of the debris discourager includes a non-uniform surface that generates a wind flow to prevent debris from entering a sealed interface.

12 Claims, 5 Drawing Sheets

(56) References Cited

U.S. PATENT DOCUMENTS

| | | | |
|---|---|---|---|
| 2004/0009059 A1* | 1/2004 | Soechting et al. | 415/115 |
| 2004/0202536 A1* | 10/2004 | Macfadyen | 415/111 |
| 2005/0058533 A1* | 3/2005 | Belokon et al. | 415/1 |
| 2005/0132706 A1* | 6/2005 | Fukutani et al. | 60/726 |
| 2005/0271504 A1 | 12/2005 | Ferra | |
| 2009/0047124 A1 | 2/2009 | Glahn et al. | |
| 2009/0110545 A1* | 4/2009 | Davis et al. | 415/173.1 |
| 2009/0155073 A1* | 6/2009 | Servant | 415/229 |
| 2010/0254807 A1 | 10/2010 | Smoke et al. | |
| 2011/0047959 A1 | 3/2011 | DiBenedetto | |
| 2011/0129342 A1 | 6/2011 | Smoke et al. | |

OTHER PUBLICATIONS

Collins English Dictionary, definition of "spline".*
International Preliminary Report on Patentability for International Application No. PCT/US2013/040850 mailed Dec. 4, 2014.

* cited by examiner

ROTATIONAL DEBRIS DISCOURAGER FOR GAS TURBINE ENGINE BEARING

BACKGROUND

This disclosure relates to debris discourager for a gas turbine engine that prevents debris from entering a seal interface.

A typical jet engine has multiple shafts or spools that transmit torque between turbine and compressor sections of the engine. In one example, a low speed spool generally includes a low shaft that interconnects a fan, a low pressure compressor, and a low pressure turbine. A high speed spool generally includes a high shaft that interconnects a high pressure compressor and high pressure turbine. The high and low shafts are supported for rotation relative to an engine static structure by various bearings. Carbon seals are typically utilized in each bearing compartment to provide a sealed interface between the rotating and static structures. The seals include a first seal component fixed to the static structure and a second seal component rotatable with a rotating structure. The first and second seal components cooperate to separate a wet side within the bearing compartment from a dry side external of the bearing compartment.

Wet and dry face carbon seals are vulnerable to damage because the seals are one of the few interfaces within the gas turbine engine that have a static surface that is directly contacting a rotating surface. In order to prevent wear between these two surfaces in such a harsh environment, it is important to prevent debris from entering the sealed interface and acting like an abrasive that is ground between the components. Debris discouragers have been used near carbon seals in an attempt to prevent debris from entering the sealed interface; however, these discouragers have not always been effective.

SUMMARY

In one featured embodiment, a debris discourager for a gas turbine engine has a body rotatable about an engine axis and extending between a fore end and an aft end. A portion of the body includes a non-uniform surface that generates a wind flow to prevent debris from entering a sealed interface.

In another embodiment according to the previous embodiment, the non-uniform surface comprises a segmented surface having a plurality of extensions circumferentially separated from each other by a plurality of recesses.

In another embodiment according to any of the previous embodiments, the non-uniform surface is formed within the aft end.

In another embodiment according to any of the previous embodiments, the body comprises a bearing nut.

In another embodiment according to any of the previous embodiments, the bearing nut defines an inner peripheral surface that is configured for connection to a rotating gas turbine engine shaft.

In another embodiment according to any of the previous embodiments, the non-uniform surface includes a shield portion formed about an outer peripheral surface of the body with a plurality of extensions being located aft of the shield portion.

In another embodiment according to any of the previous embodiments, the shield portion defines an aft face that includes a plurality of discrete pockets circumferentially spaced apart from each other about the engine axis.

In another featured embodiment, a gas turbine engine has an engine static structure, a shaft rotatable about an axis of rotation relative to the engine static structure, a seal having at least a first seal component associated with the engine static structure and a second seal component associated with the shaft, the first and second seal components cooperating with each other to define a seal interface, and a debris discourager mounted for rotation with the shaft and including a non-uniform surface that generates a wind flow to prevent debris from entering the seal interface.

In another embodiment according to any of the previous embodiments, the debris discourager comprises a body that extends between a fore end and an aft end, and wherein the non-uniform surface is formed adjacent the aft end.

In another embodiment according to any of the previous embodiments, the non-uniform surface comprises a segmented surface having a plurality of extensions circumferentially separated from each other about the axis by a plurality of recesses.

In another embodiment according to any of the previous embodiments, each extension includes an axial portion extending from the aft end of the body in a direction generally parallel to the axis to a distal end and radial portion extending radially inwardly toward the axis from the distal end of the axial portion.

In another embodiment according to any of the previous embodiments, an inner peripheral surface of the axial portion includes a groove configured to receive a snap ring.

In another embodiment according to any of the previous embodiments, the body defines an outer peripheral surface and an inner peripheral surface, and wherein the body includes a shield portion formed about the outer peripheral surface with the extensions extending axially aft of the shield portion.

In another embodiment according to any of the previous embodiments, the shield portion comprises a flange formed circumferentially about the outer peripheral surface of body, the flange having a flange diameter that is greater than an outer diameter that defines the plurality of extensions.

In another embodiment according to any of the previous embodiments, the body comprises a bearing nut having an inner peripheral surface configured to be fixed to the shaft.

In another embodiment according to any of the previous embodiments, the bearing nut is positioned radially between the seal interface and the shaft.

In another embodiment according to any of the previous embodiments, the debris discourager includes a first end that is in abutting engagement with the second seal component and a second end that extends aft of the seal interface.

In another embodiment according to any of the previous embodiments, the second seal component is in abutting engagement with an inner bearing race.

In another embodiment according to any of the previous embodiments, the non-uniform surface comprises a segmented surface having a plurality of extensions circumferentially separated from each other about the axis by a plurality of recesses, and wherein the debris discourager includes a shield portion formed about an outer peripheral surface of the debris discourager, the shield portion having an outer shield diameter that is greater than an outer extension diameter that defines the extensions.

In another embodiment according to any of the previous embodiments, the debris discourager comprises a bearing nut with the non-uniform surface comprising a segmented shield portion formed circumferentially about an outer surface of the bearing nut.

BRIEF DESCRIPTION OF THE DRAWINGS

The disclosure can be further understood by reference to the following detailed description when considered in connection with the accompanying drawings wherein.

DETAILED DESCRIPTION

Figure 1:
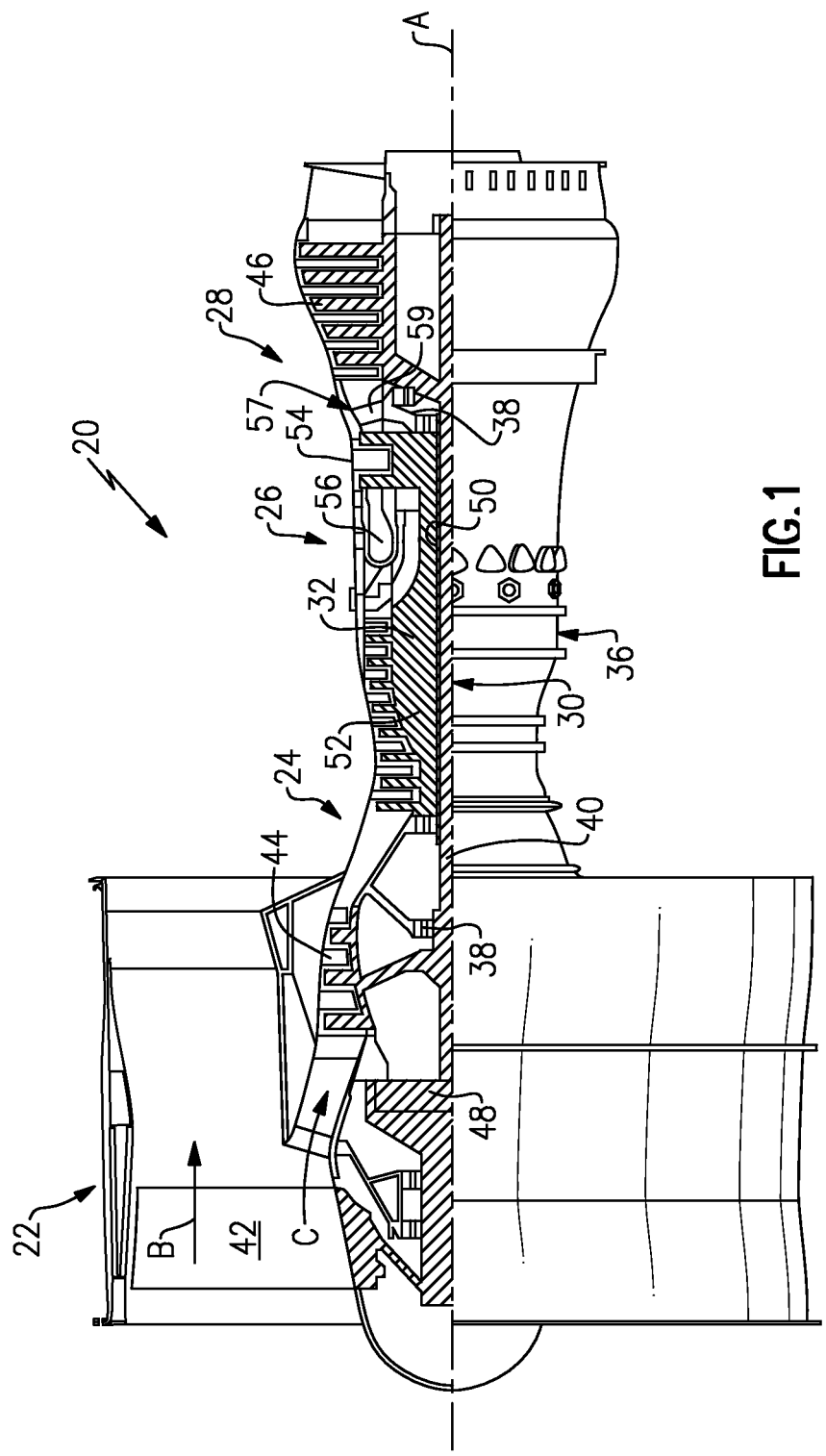
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
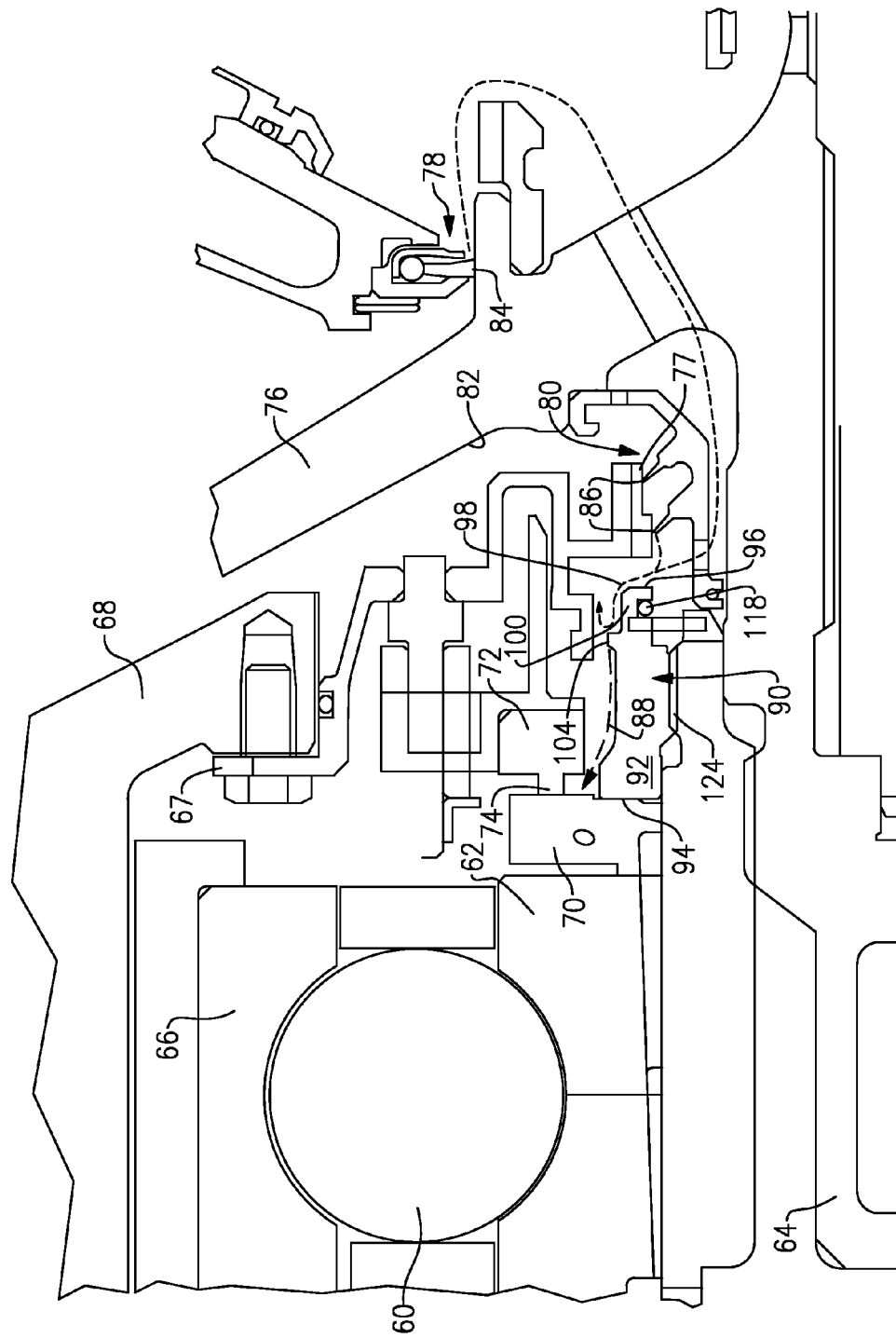
FIG. 2 is a cross-sectional view of an example of debris discourager of the gas turbine engine shown in FIG. 1.

Referring to FIG. 2, a bearing 60 includes an inner race 62 fixed to a rotating shaft 64 and an outer race 66 fixed to a carbon seal housing 67. The carbon seal housing 67 is fixed to an engine static structure 68. A seal includes at least a first seal component 70 fixed for rotation with the shaft 64 and a second seal component 72 comprising a non-rotating component that is associated with the carbon seal housing 67. The first 70 and second 72 seal components contact each other at a seal interface 74.

A rotating disc 76 is attached for rotation with the shaft 64 and extends radially outwardly from the axis A. In one example, a brush seal 78 is mounted to the engine static structure aft of the disc 76 and a knife edge seal 80 is associated with a fore side 82 of the disc 76. The brush seal 78 extends to a distal end 84 that contacts the disc 76 and the knife edge seal 80 comprises a plurality of tips 86 that contact an abradable material 77. Due to the contact between rotating and non-rotating components, the brush seal 78 and knife edge seal 80 comprise possible sources of debris that could possibly enter the seal interface 74 (see arrow 88).

A bearing nut 90 comprises a debris discourager that is used to prevent debris from entering the seal interface 74. The bearing nut 90 is rotatable about the axis A and has a body 92 that extends between a fore end 94 and an aft end 96. A portion of the bearing nut 90 includes a non-uniform surface that generates a wind flow to prevent debris from entering a sealed interface. An example debris repelling path is indicated with arrow 98.

In one example, the non-uniform surface of the bearing nut 90 comprises an undulating or segmented surface. In the example shown in FIGS. 2-4, the body 92 includes a plurality of extensions 100 extending from the aft end 96 that are circumferentially spaced apart from each other about the axis A and are separated from each other by a plurality of recesses 102. The body 92 includes a discourager portion or shield portion 104 (FIG. 3) formed about an outer peripheral surface 106 with the extensions 100 being located aft of the shield portion 104.

In operation, rotation of the bearing nut 90 in combination with the non-uniform surface creates windage (similar to that created by a rotating fan) that slings debris outwardly. Further, the shield portion 104 cooperates with the non-uniform surface to deflect debris rearwardly, i.e. in an aft direction, away from the seal interface 74.

In one example, the body 92 comprises a bearing nut that facilitates seating the bearing 60 on a structure fixed for rotation with the shaft 64. In one example, the fore end 94 of the body 92 abuts against the first seal component 70, which is in abutting engagement with the bearing inner race 62. The body 92 defines an inner peripheral surface 108 that is configured for attachment to the structure fixed to the shaft 64. In one example, the attachment comprises a threaded attachment interface.

Figure 3:
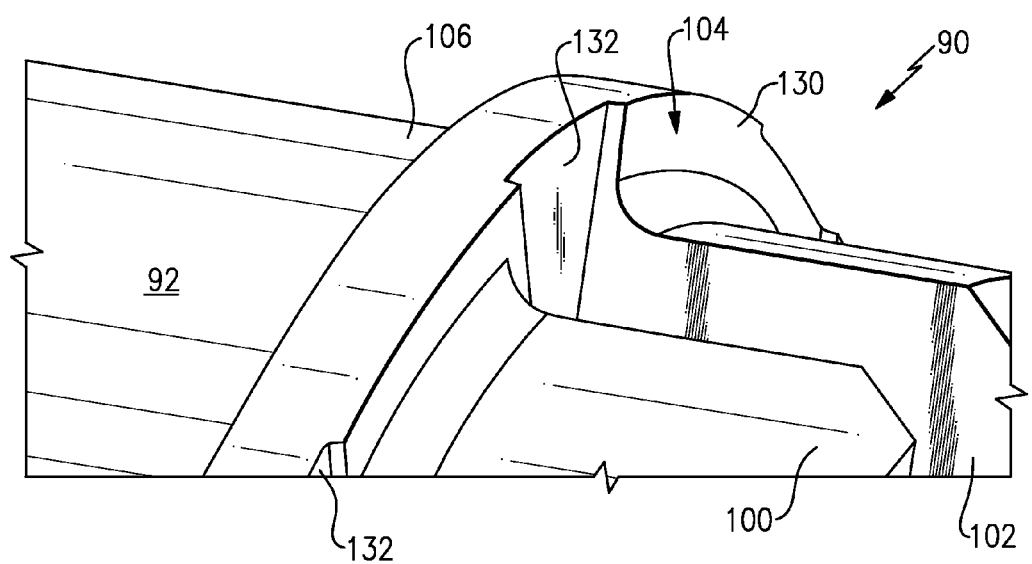
FIG. 3 is an enlarged perspective view of a shield portion of the debris discourager of FIG. 2.
Figure 4:
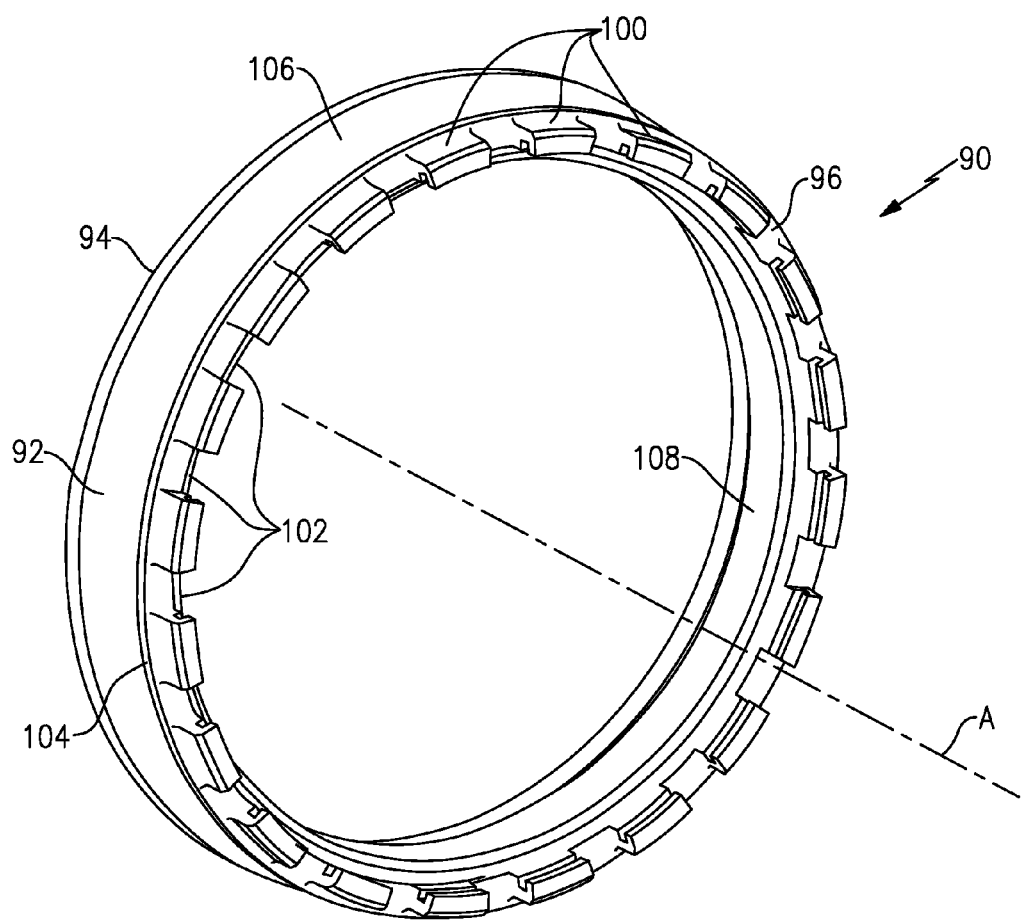
FIG. 4 is a perspective view of the debris discourager of FIG. 2.
Figure 5:
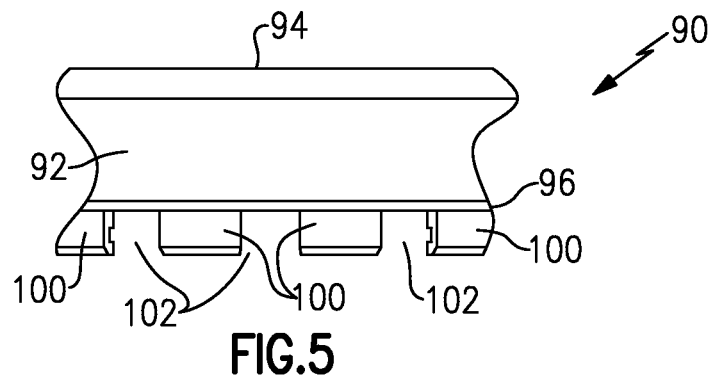
FIG. 5 is a top view of the debris discourager of FIG. 4.
Figure 6:
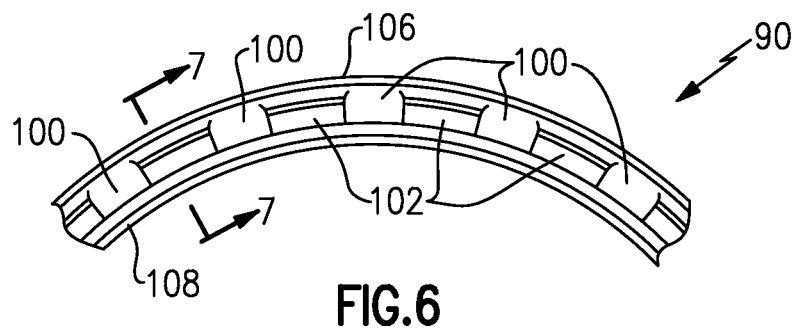
FIG. 6 is a partial aft end view the debris discourager of FIG. 4.

The debris discourager 90 is shown in greater detail in FIGS. 3-7. The body 92 comprises a ring-shaped structure (FIG. 4) that has an hour-glass shape as viewed along an axial length (FIG. 5). The plurality of extensions 100 extend outwardly from the aft end 96 and are circumferentially spaced apart from each other about the axis A.

Figure 7:
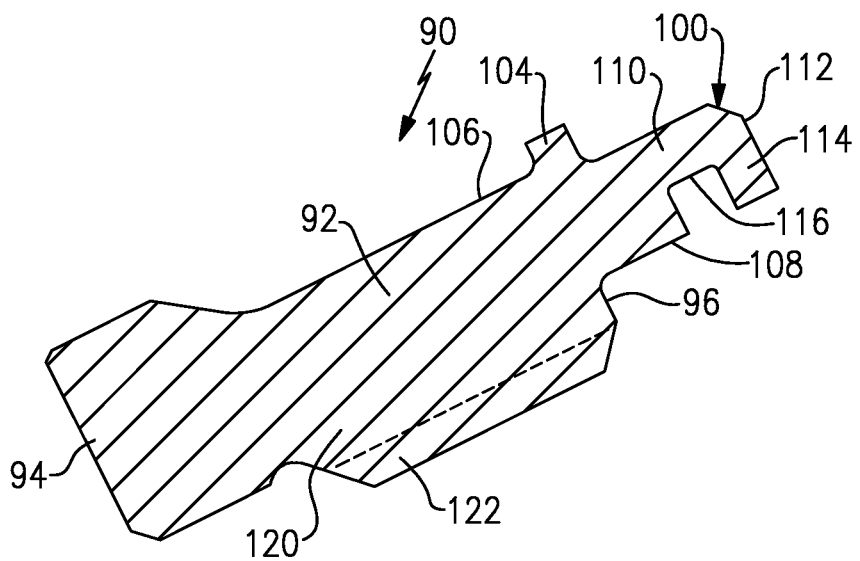
FIG. 7 is a cross-sectional view of an extension of the debris discourager as indicated in FIG. 6.

As best shown in FIG. 7, each extension 100 includes an axial portion 110 extending from the aft end 96 of the body 92 in a direction generally parallel to the axis A to a distal end 112 and radial portion 114 extending radially inwardly toward the axis A from the distal end 112 of the axial portion 110. The inner peripheral surface 108 of the axial portion 110 includes a groove 116 configured to receive a snap ring 118 (FIG. 2). The outer peripheral surface 106 includes the shield portion 104 and the extensions 100 extending axially aft of the shield portion 104. In the example shown, the shield portion 104 comprises a flange formed circumferentially about the outer peripheral surface 106 of body 92, where the flange has a flange diameter that is greater than an outer diameter that defines the plurality of extensions 100 (FIG. 3).

A mid-body portion 120 of the body 92 includes a splined surface 122 that mates with splines 124 (FIG. 2) formed on an outer peripheral surface of the structure fixed to the shaft 64. The mid-body portion 120 has a greater thickness than a thickness of the axial portion 110 of the extensions 100 (FIG. 7). The fore end 94 of the body 92 also has an increased thickness compared to the thickness of the axial portion 110 of the extensions. This provides an increased contact area between the body 92 and the first seal component 70.

As best shown in FIG. 3, the shield portion 104 defines an aft face 130 that includes a plurality of discrete pockets 132 circumferentially spaced apart from each other about the axis A. These pockets 132 further increase windage and slinging capability of the discourager. In one example, the pockets 132 are aligned with the recesses 102. Further, the pockets and recesses can be aligned between extensions to define a tooling interface to receive a tool to tighten the bearing nut (discourager) against the bearing 38.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    an engine static structure;
    a shaft rotatable about an axis of rotation relative to the engine static structure;
    a seal having at least a first seal component fixed to the engine static structure and a second seal component fixed to the shaft, the first and second seal components cooperating with each other to define a seal interface, and wherein the first seal component extends aft of the second seal component;
    a debris discourager mounted for rotation with the shaft and extending from a fore end to an aft end that extends aft of the seal interface, the debris discourager including a non-uniform surface that generates a wind flow to prevent debris from entering the seal interface; and
    wherein the debris discourager comprises a bearing nut with the non-uniform surface comprising a segmented shield portion formed circumferentially about an outer surface of the bearing nut.

2. The gas turbine engine according to claim 1 wherein the debris discourager comprises a body that extends between the fore end and the aft end, and wherein the non-uniform surface is formed adjacent the aft end.

3. The gas turbine engine according to claim 1 wherein the fore end is in abutting engagement with the second seal component.

4. A gas turbine engine comprising:
    an engine static structure;
    a shaft rotatable about an axis of rotation relative to the engine static structure;
    a seal having at least a first seal component fixed to the engine static structure and a second seal component fixed to the shaft, the first and second seal components cooperating with each other to define a seal interface, and wherein the first seal component extends aft of the second seal component; and
    a debris discourager mounted for rotation with the shaft and extending from a fore end to an aft end that extends aft of the seal interface, the debris discourager including a non-uniform surface that generates a wind flow to prevent debris from entering the seal interface, and wherein the debris discourager comprises a body that extends between the fore end and the aft end, and wherein the non-uniform surface is formed adjacent the aft end, and wherein the non-uniform surface comprises a segmented surface having a plurality of extensions circumferentially separated from each other about the axis by a plurality of recesses.

5. The gas turbine engine according to claim 4 wherein each extension includes an axial portion extending from the aft end of the body in a direction generally parallel to the axis to a distal end and radial portion extending radially inwardly toward the axis from the distal end of the axial portion.

6. The gas turbine engine according to claim 5 wherein an inner peripheral surface of the axial portion includes a groove configured to receive a snap ring.

7. The gas turbine engine according to claim 4 wherein the body defines an outer peripheral surface and an inner peripheral surface, and wherein the body includes a shield portion formed about the outer peripheral surface with the extensions extending axially aft of the shield portion.

8. The gas turbine engine according to claim 7 wherein the shield portion comprises a flange formed circumferentially about the outer peripheral surface of body, the flange having a flange diameter that is greater than an outer diameter that defines the plurality of extensions.

9. The gas turbine engine according to claim 4 wherein the body comprises a bearing nut having an inner peripheral surface configured to be fixed to the shaft.

10. The gas turbine engine according to claim 9 wherein the bearing nut is positioned radially between the seal interface and the shaft.

11. A gas turbine engine comprising:
an engine static structure;
a shaft rotatable about an axis of rotation relative to the engine static structure;
a seal having at least a first seal component fixed to the engine static structure and a second seal component fixed to the shaft, the first and second seal components cooperating with each other to define a seal interface, and wherein the first seal component extends aft of the second seal component; and
a debris discourager mounted for rotation with the shaft and extending from a fore end to an aft end that extends aft of the seal interface, the debris discourager including a non-uniform surface that generates a wind flow to prevent debris from entering the seal interface, and wherein the fore end is in abutting engagement with the second seal component, and wherein the second seal component is in abutting engagement with an inner bearing race.

12. The gas turbine engine according to claim 11 wherein the non-uniform surface comprises a segmented surface having a plurality of extensions circumferentially separated from each other about the axis by a plurality of recesses, and wherein the debris discourager includes a shield portion formed about an outer peripheral surface of the debris discourager, the shield portion having an outer shield diameter that is greater than an outer extension diameter that defines the extensions.

* * * * *